United States Patent [19]

Thomason

[11] 3,965,696
[45] June 29, 1976

[54] CROP DRYING (FOOD PRESERVING) APPARATUS

[76] Inventor: Harry Emmitte Thomason, 6802 Walker Mill Road, SE., Washington, D.C. 20027

[22] Filed: Dec. 21, 1973

[21] Appl. No.: 427,313

[52] U.S. Cl. ............................... 62/324; 62/238; 62/160; 165/50; 34/20; 34/93
[51] Int. Cl.² ............................................. F25J 3/02
[58] Field of Search ................ 62/324, 2, 160, 238, 62/3; 34/20, 93; 165/50

[56] References Cited
UNITED STATES PATENTS

| 484,182 | 10/1892 | Dewey | 62/3 |
|---|---|---|---|
| 1,935,281 | 11/1933 | Reed | 62/178 |
| 2,282,210 | 5/1942 | Plum | 165/50 |
| 2,342,566 | 2/1944 | Wolfert | 62/324 |
| 2,412,774 | 12/1946 | Hoffman | 62/238 |
| 2,467,464 | 4/1949 | Carriere | 62/238 |
| 2,529,154 | 11/1950 | Hammond | 62/2 |
| 2,873,585 | 2/1959 | Dodge | 62/324 |
| 2,973,627 | 3/1961 | Lackey | 62/3 |
| 3,077,079 | 2/1963 | Pietsch | 62/3 |
| 3,181,604 | 5/1965 | Kritzer | 165/50 |
| 3,242,679 | 3/1966 | Pucket | 62/2 |
| 3,308,633 | 3/1967 | Kritzer, Jr. | 62/239 |
| 3,351,128 | 11/1967 | Barnd | 165/50 |
| 3,354,946 | 11/1967 | Dean | 165/50 |
| 3,371,504 | 3/1968 | Brindley | 62/324 |

FOREIGN PATENTS OR APPLICATIONS

| 273,897 | 7/1951 | Switzerland | 62/324 |

Primary Examiner—William E. Wayner
Assistant Examiner—Henry C. Yuen

[57] ABSTRACT

For drying of crops and preserving of foods or other perishables or such a heat pump is used. The heat producing end or "Hot" side of the heat pump may be used to produce warm dry air for drying while the cold producing end or "Cold" side produces cool dry air for drying. The effect is to obtain much more drying per kilowatt hour of electricity used than if the electricity were used through resistance heating elements, as is now a common practice. Our precious energy is conserved and used much more efficiently.

In addition to heat pump Hot and Cold drying, Solar Energy may also be used. That goes a step further in conserving our energy, during the Energy Crisis, and both approaches help to alleviate the Pollution Crisis by using less of our electrical or combustion produced energy, that must be produced by pollution creating equipment.

A portion or all of the heat output, or cooling output, may be used for heating or cooling a home or other building.

The overall effect is to reduce our use of foreign energy supplies, to reduce our balance of payments due to foreign countries, to reduce our indebtedness to the oil Shieks of foreign lands, and to save money and energy for our own food producers who supply us with food, feeds and perishables. That, in turn, means lower costs for the peoples for their food and living expenses.

9 Claims, 2 Drawing Figures

CROP DRYING (FOOD PRESERVING) APPARATUS

BRIEF SUMMARY-INTRODUCTION

The invention is described in relation to crop drying apparatus although it obviously is usable for other purposes. For crop drying the previous supplies of natural and bottled gas (propane, butane, etc.) are in short supply. Farmers and huge grain elevator operators are turning to expensive electricity for their drying bins. That, in turn, leads to a shortage of electricity causing brownouts and blackouts. It also causes pollution of the air, as well as thermal pollution of cooling water in our lakes and rivers as we produce the electricity. Only about one-third of our precious energy can be delivered to the home, factory or farm in the form of electricity, with two-thirds being wasted. That means the cost is high and the supply is limited. We must seek more efficient ways to use this energy.

Obviously clean, free, non-polluting solar energy can be used. However, modern high-speed drying equipment requires tremendous amounts of heat, day and night during peak harvest periods if drying is to be accomplished around the clock. In some crop dryers hundreds of bushels of corn per hour are dried with fairly clean fairly dry heat from gas, used at a very high rate of millions of Btus per hour. (A gas flame gives off a substantial amount of water vapor as one of the products of combustion.) It would be difficult to meet that kind of heat load with solar energy alone. And, although electric heat is cleaner and dryer, it would also be difficult and expensive to meet it with electricity used in common resistance heating elements. Therefore, more efficient apparatus is needed, using less of our precious energy, as taught hereinafter.

When electricity is used through a heat pump, especially during mild or cool autumn crop-drying weather, heat is produced at the Hot side that is many times greater than that obtainable by direct use of the electricity in resistance heaters. And, similarly important, the output from the Cold side is usable for crop drying. The cold coil dehumidifies and chills the air blown therethrough. That cool dry air, blown through freshly harvested crops, not only dries them but it cools them, thereby reducing or eliminating spoilage. The cool dried crop does not heat up and spoil. Therefore the drying period can be lengthened significantly, for weeks if necessary, in order to dry more crops over a longer period of time. This is accomplished with lower-capacity equipment and with less total energy input. And, solar energy input during the longer drying period can be used to supplement heat produced by a heat pump.

If desired the hot and cold outputs can be supplied to a pair, or pairs, of crop drying containers or bins for a period of time to partially heat and dry the contents of one while partially cold-drying the contents of the other. Then the outputs can be switched to cold-dry one while hot-drying the other. (This is a simple matter with a heat pump having reversing valves. The hot side becomes the cold side instantly, and the cold side becomes the hot side, when the valves are switched.) Or, the cold dry air may be used to refrigerate one container for a period of time and then be switched to another container, thus preserving the contents of both while they are cold-dried or until they can be hot-dried.

Much of the crop drying is accomplished in autumn weather when little heat is needed for a home or other building, or little air conditioning is needed. So, the equipment (heat pump, etc.) can be used during that period for crop drying but may be switched to heating the home or other building during the winter and air conditioning it during the summer. Therefore the heat pump serves many functions, reducing energy consumption spring, summer, autumn and winter.

Other apparatus and modes of operation will suggest themselves to those skilled in the art.

IN THE DRAWING

Figure 1:
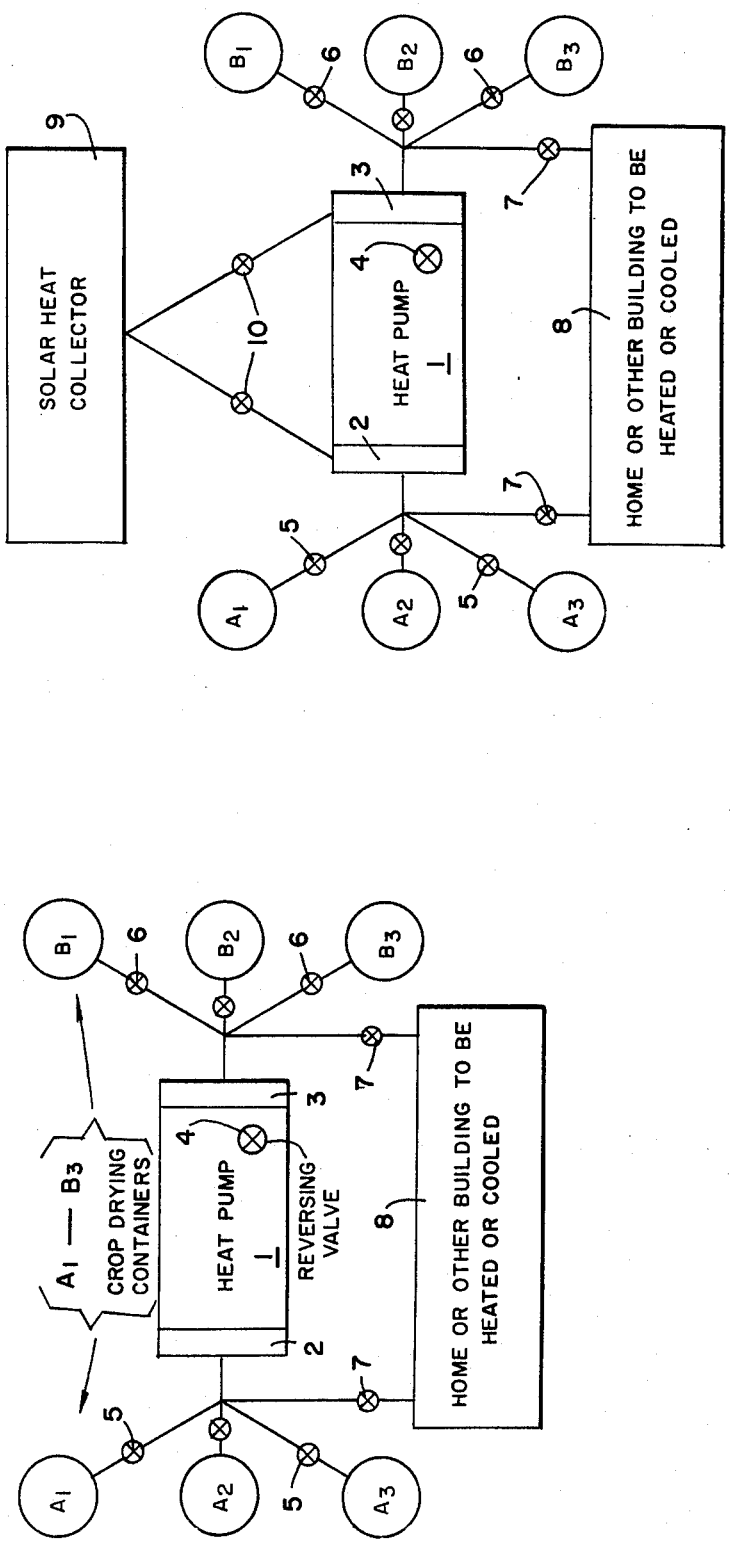
FIG. 1 is a schematic diagram of one form of the invention.

In FIG. 1 heat pump 1 has a Hot side 2 and a Cold side 3, the hot and cold sides preferably being reversible by valve 4 in a manner that is well understood in the art. The hot side 2 supplies heat to containers $A_1$, $A_2$, and $A_3$ while cold side 3 supplies cold to containers $B_1$, $B_2$, and $B_3$. Typically containers A and B may be crop drying bins such as grain silos or such, or they may be hay drying barns or such, or they may be other types of food preserving containers. Valves or dampers 5 and 6 may be used to divert the flow of heating or cooling fluid to the various containers as desired.

As an example of 1. heat may be supplied to container $A_1$ while cold is supplied to $B_1$ for a desired period of time. That operation may be continued until the contents of each container is dried sufficiently. As an alternative, reversing heat pump valve 4 may be switched after a predetermined period and heat may be supplied to container $B_1$ while cold is supplied to container $A_1$. As another alternative heat may be supplied to container $A_1$ while cold is supplied to container $B_1$ and then heat may be switched to $A_2$ and cold to $B_2$, and then to $A_3$ and $B_3$. If desired the sequential heating and cooling may last for hours, or for days, to each container. Similarly, if reversing of heat and cold supplies to the same containers is desired, the periods may be for hours or for days for each type of operation. Of course if the heat pump is of low capacity, and the stores of crops are large, the heating, cooling and drying periods may require weeks. Also, if desired, the crops may be removed when sufficiently dried and replaced by freshly harvested crops to be dried.

During harvest time all of the silos or bins are not filled at the same moment. Therefore heat and cold can be supplied to bins $A_1$ and $B_1$ for drying while they are being filled, which sometimes requires several days. The heat and cold supplies may be continued while $A_2$ and $B_2$ are being filled, or may be reversed to $B_1$ and $A_1$, or may be switched to $A_2$ and $B_2$ while they are being filled. After all bins have been filled the hot and cold supplies may be cycled as needed to the various bins. Some, having been filled days or weeks earlier, will have the contents partially or completely dry so the hot and cold dry air may be diverted primarily to the freshly filled bins to reduce their moisture content.

One heat pump or a bank of heat pumps may be used if needed. Then if one heat pump needs to be repaired the others will continue to supply heat and cold.

As chilly autumn nights bring on a need for a little home heating a little of the heat may be diverted by valves 7 to warm the home 8, at very low cost due to high efficiency of a heat pump in using electricity to pump heat.

If desired the crops in the bin or bins may be used to serve another function, as a heat sink. On bitter cold days and nights the crops will be warmer than the surrounding air. And, air or other fluid may be circulated through the bin to extract heat from the crops and supply it to the cold side of the heat pump. That, in turn, means more heat for the home supplied from the hot side of the heat pump, and the heat pump compressor uses less electrical energy while supplying the same amount of heat per hour, or more, to the home. Therefore the heat pump will supply heat for the home at very low cost. Indeed, a solar heat collector may be used as described in FIG. 2 hereinafter to replenish the supply of heat in the crops each day as the sun shines to thereby supply heat from the crops for the heat pump to heat the home at night. (However, care may have to be exercised to avoid overdrying and damaging some types of crops when this type of energy-saving operation is employed.)

During the hot summer the heat pump can be used to air condition the home.

Building 8 could be a poultry house, cattle barn, or other. By keeping such a building partially warmed by low-cost heat from the heat pump (or solar heat collector of FIG. 2, or both) the poultry and livestock require less of our precious expensive feed. The Btus or calories supplied by the heat pump (and solar heat collector) reduce the amount of feed needed to produce those Btus or calories to keep the poultry or livestock warm.

The heat pump or pumps 1, valves 4, 5, 6, 7 and 10, etc. are illustrated only diagrammatically. It will be obvious that they may be valves in liquid lines, or dampers in air or other gas supply or return lines depending on the exact type of installation. As a few examples:

1. The heating coil may be at 2 and warm air may be supplied through dampers 5 to bins $A_1$, $A_2$, and $A_3$, driven by a conventional blower, or to a home or other building 8 through damper 7, or to both simultaneously. Simultaneously cold air can be supplied from cold coil 3 to bins $B_1$, $B_2$ and $B_3$, driven by a blower. Of course, reversing valve 4 instantly changes the hot coil to a cold coil, and vice versa, as desired. Therefore cold air for cooling or air conditioning could be supplied to the home from either side of the heat pump (side 2 or side 3).

2. Heat pump 1 may be used to pump hot refrigerant (Freon or such) to a hot coil in container $A_1$ through a valve 5 and cold refrigerant to a cold coil in container $B_1$ through a valve 6. Obviously return lines would be provided for the refrigerant although not specifically illustrated in the drawings. Here again reversing valve 4 instantly changes the hot and cold coils to cold and hot respectively.

3. In either of examples 1 and 2 the home or other building 8 may be heated, or air conditioned, by opening the appropriate damper 7, or by using a heating/cooling coil in the home supplied by hot or cold refrigerant through valve or valves 7.

Figure 2:
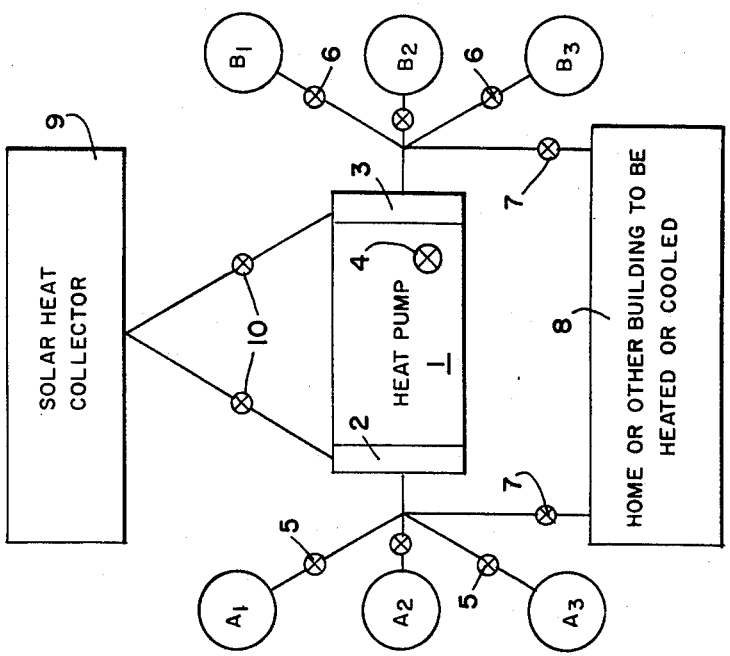
FIG. 2 is a schematic diagram of another form of the invention.

In FIG. 2 supplementary heat from solar heat collector 9 may be supplied to the heat pump through valves 10 or directly to the containers $A_1$, $A_2$, $A_3$, or $B_1$, $B_2$, $B_3$ directly. At times the output of the solar heat collector will be sufficient for drying at a predetermined rate. The heat pump may be used as needed, at night or on cloudy or damp rainy days. Valves or dampers 10, 5 and 6 may be used to direct the solar produced heat as desired. The heat from the collector may be brought out by hot air or heated liquid, or both. It may be delivered to the home, or to heat storage apparatus when not needed for crop drying. Or, as described above, the solar produced heat could be stored in the crops for use on cold nights as a source of heat for the heat pump and the home.

I claim:

1. Apparatus for preserving perishables comprising a heat pump for producing both heat and cold, means for supplying heat from said heat pump to a first container to preserve the contents therein, means for supplying cold from said heat pump to a second container to preserve the contents therein, and means for switching the heat and cold supplies to supply cold to said first container and heat to said second container to thereby preserve said perishables by alternate heating and cooling and to conserve energy by using both the heat and cold outputs of the heat pump to preserve perishables, the duration of time after which the switching takes place being such that the temperature of the perishables in the second container is effectively raised and the temperature of the perishables in the first container is effectively lowered.

2. Apparatus as in claim 1 and means for supplying heat from said heat pump to a third container to preserve perishables therein.

3. Apparatus as in claim 1 and means for supplying heat from said heat pump to a third container and cold from said heat pump to a fourth container to preserve perishables therein.

4. Apparatus as in claim 3 and means for switching said heat and cold supplies to supply cold to said third container and heat to said fourth container to preserve perishables therein.

5. Apparatus as in claim 1 and means for supplying cold from said heat pump to a third container to preserve perishables therein.

6. Apparatus as in claim 1 and means for supplying cold from said heat pump to a third container and heat from said heat pump to a fourth container to preserve perishables therein.

7. Apparatus as in claim 1 and means for supplying heat from said heat pump to a home or other building to be heated.

8. Apparatus as in claim 1 and means for supplying cold from said heat pump to a home or other building to be cooled.

9. Apparatus as in claim 1 wherein one of said containers serves as a heat sink to receive heat from said heat pump at times and to deliver up heat to said heat pump at other times, thereby conserving heat energy.

* * * * *